No. 766,362.

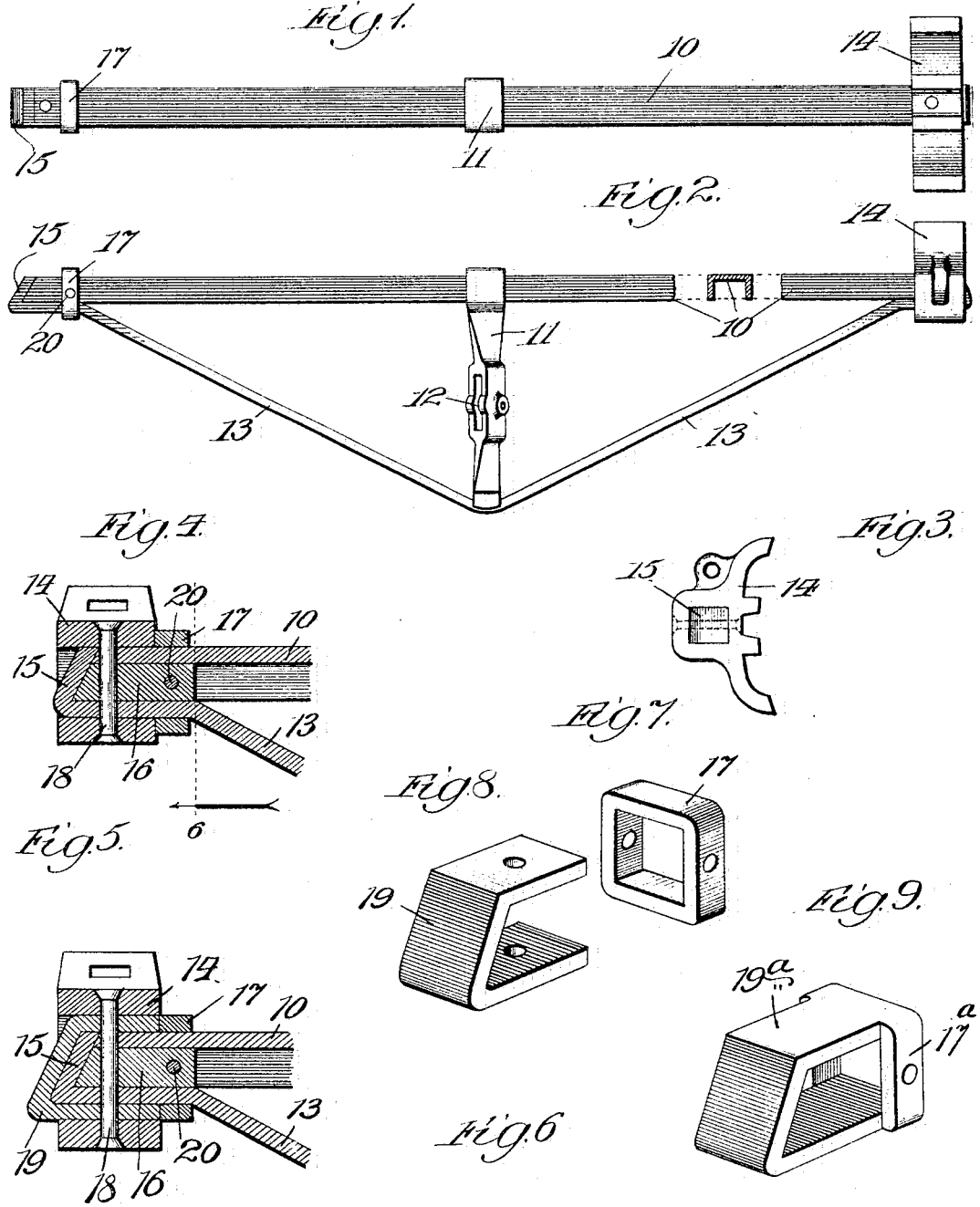

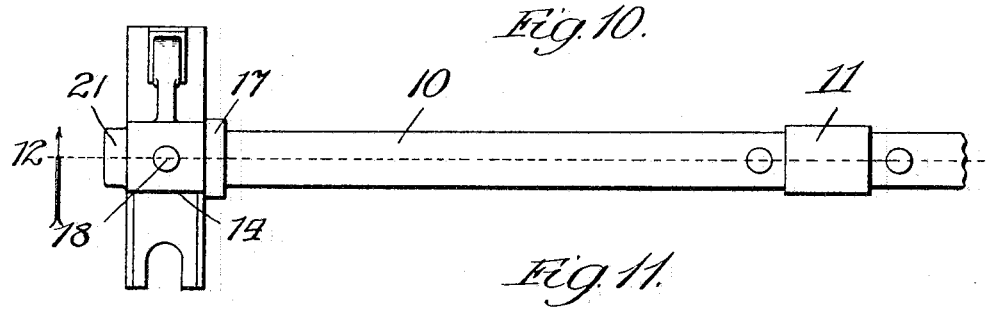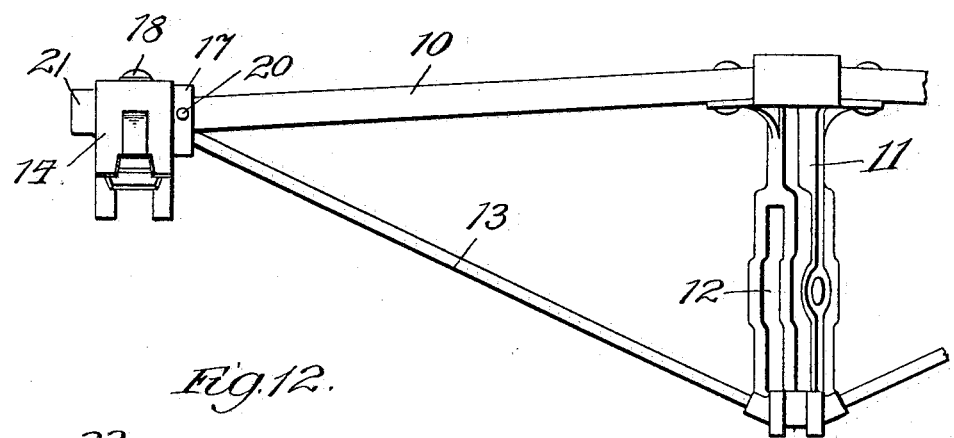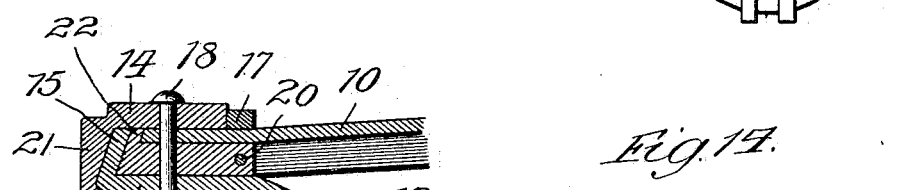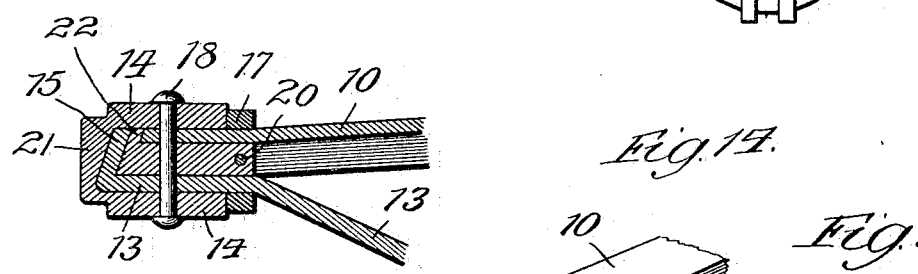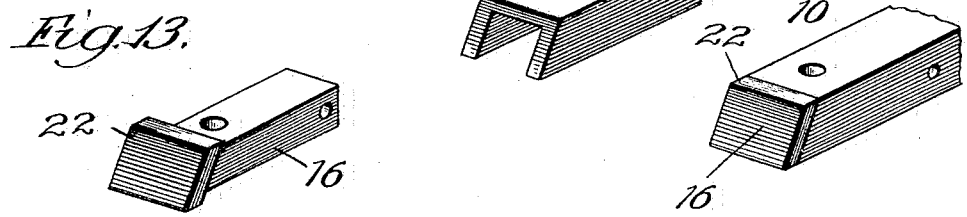

Patented August 2, 1904.

UNITED STATES PATENT OFFICE.

ROBERT P. LAMONT, OF CHICAGO, ILLINOIS, ASSIGNOR TO SIMPLEX RAILWAY APPLIANCE COMPANY, OF CHICAGO, ILLINOIS, A CORPORATION OF ILLINOIS.

BRAKE-BEAM.

SPECIFICATION forming part of Letters Patent No. 766,362, dated August 2, 1904.

Application filed December 12, 1903. Serial No. 184,857. (No model.)

*To all whom it may concern:*

Be it known that I, ROBERT P. LAMONT, a citizen of the United States, residing at Chicago, in the State of Illinois, have invented certain new and useful Improvements in Brake-Beams, of which the following is a specification.

My invention relates particularly to the beams for holding brake heads and thrusting the brakes against the wheels, especially such beams as are constructed in truss form from commercial rolled iron, and to the means for securing the ends of the tension and thrust members thereof. The primary objects of the invention are, to make a neat and compact joint of the ends of the two members, to form a firm abutment for the thrust member and to make a secure housing to hold the parts properly in place so as not to be dependent entirely upon the rivets. These objects and other advantages which will hereinafter appear, I attain by means of the construction illustrated in preferred form in the accompanying drawing, in which—

Figure 1 is a plan view of the brake beam, with one of the brake heads removed.

Figure 2 is a side elevation of the same;

Figure 3 is an end elevation;

Figure 4 is a central longitudinal section of the end showing the brake head in place and the attaching means for the two members;

Figure 5 is a similar section of a modification with the brake head placed on a confining strap on the beam;

Figure 6 is a section on line (6) of Figure 4;

Figures 7 and 8 are perspective views of the confining devices;

Figure 9 is a similar view of a modified housing;

Figures 10 and 11 are respectively a side elevation and a plan, of a modification of the brake head and housing for the end and of the central strut;

Figure 12 is a central longitudinal section of the modified head;

Figures 13, 14 and 15 are perspective views showing respectively a modified filler block, the end of the beam, and the block put in place therein.

The thrust member 10 may be made of any desired commercial form of rolled iron such as channel, hollow square, solid, or other form as may be desired. The tension member 13 is preferably made of bar iron, and at the center is provided a strut or post 11 which may conveniently be attached to the thrust member 10 by means of an eye, and has a slot 12 for the brake lever. The end of bar 10 preferably has a mitered face and the end of the tension member 13 is lapped partially over its end, as clearly shown in Figures 4, 5, and 12.

In the form of Figure 4 the brake head 14 fits closely over the members 10 and 13 and abuts against the ring 17 which surrounds both members. The space between the flanges of the channel member 10 may be filled with the block 16 where desired, and this block may be plain as in this figure, or may have a head 22 as in Figure 13. The brake head bolt or rivet 18 passes through both members and the block. It will be seen that the slanting position of the upwardly hooked end 15 of the tension member 13, by abutting against the inside of the brake head, is fully secured by the head itself, since it cannot bend outward. The ring 17 may be riveted, and preferably the rivet will be placed through the side so as not to weaken the tension member 13.

In Figure 5 I have shown a modification in which the bent end 15 is secured by a supplementary strap 19 placed inside the brake head, and this may be either made separate from the ring 17, as in Figures 7 and 8, or may be made integral therewith, as shown in Figure 9. Otherwise the brake head may be modified as shown in Figures 10, 11, and 12, so that the head 14 has a pocket 21 surrounding the end of the beam and in contact with the hook 15 to prevent its straightening out. The filler block 16 is provided with a flange 22 which engages the mitered end of beam 10 and furnishes a firmer seat for the tension member 13. (See Figure 15.)

It will be seen that the form of the end portion 15 co-operating with the inclosed parts gives a very firm abutment for the thrust member without requiring member 13 to lap over the top, and thus a very compact and easily assembled end is formed, while the ring 17 relieves the brake head from the strain of holding the parts together and the rivet 18 has practically no strain upon it. Other advantages will readily occur to those familiar with the use of brake beams.

Having thus described my invention and illustrated its use, what I claim as new, and desire to secure by Letters Patent, is the following:

1. A trussed brake beam comprising a thrust member having a mitered end and the tension member lapped over the end and slanting inward, whereby it is prevented from bending out by the brake head placed thereon.

2. The combination in a brake beam of a thrust member having its end cut on an acute angle, a tension member lapped over and in contact with the under side and slanting end of said beam, a brake head confining the two parts and held thereon by a rivet, and a ring laterally inclosing both members, substantially as described.

3. In a trussed brake beam the combination with a thrust member having a mitered end, of a tension bar having its end formed with an inwardly bent hook fitting said mitered end and ending flush with the thrust beam, and means to prevent the said hook from bending outward.

4. In a brake beam in combination with a thrust member and a tension member, an end clip and ring therefor comprising a strap surrounding the ends of the members and an attaching ring laterally inclosing the two members, substantially as described.

In testimony whereof I have hereunder signed my name in the presence of the two subscribed witnesses.

ROBERT P. LAMONT.

Witnesses:
PAUL CARPENTER,
EDWARD C. BURNS.